(12) United States Patent
Sakuragi

(10) Patent No.: US 8,638,384 B2
(45) Date of Patent: Jan. 28, 2014

(54) IMAGING APPARATUS FOR HIGH-SPEED SIGNAL READING

(75) Inventor: Takamasa Sakuragi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 340 days.

(21) Appl. No.: 13/106,935

(22) Filed: May 13, 2011

(65) Prior Publication Data

US 2011/0304756 A1 Dec. 15, 2011

(30) Foreign Application Priority Data

Jun. 14, 2010 (JP) ................................ 2010-135391

(51) Int. Cl.
  *H04N 3/14* (2006.01)
(52) U.S. Cl.
  USPC ............ 348/319; 348/294; 348/300; 348/302
(58) Field of Classification Search
  USPC ......... 348/294, 302, 312, 319, 300, 241, 308; 257/291
  See application file for complete search history.

(56) References Cited

U.S. PATENT DOCUMENTS

| | | | |
|---|---|---|---|
| 6,960,751 B2 * | 11/2005 | Hiyama et al. ................ 348/308 |
| 7,023,482 B2 | 4/2006 | Sakuragi | |
| 7,619,595 B2 | 11/2009 | Uchino et al. ................. 345/76 |
| 8,058,795 B2 | 11/2011 | Asano ........................... 313/503 |
| 8,149,309 B2 | 4/2012 | Tanaka .......................... 348/300 |
| 2003/0164887 A1 * | 9/2003 | Koizumi et al. .............. 348/308 |
| 2004/0046879 A1 * | 3/2004 | Ohzu et al. .................... 348/243 |
| 2006/0017714 A1 * | 1/2006 | Yonemoto ..................... 345/204 |
| 2008/0224621 A1 | 9/2008 | Uchino et al. ............. 315/169.3 |
| 2008/0238835 A1 | 10/2008 | Asano et al. .................... 345/76 |
| 2008/0238909 A1 | 10/2008 | Yamashita et al. ............ 345/211 |
| 2009/0033782 A1 * | 2/2009 | Muroshima et al. .......... 348/308 |
| 2009/0058780 A1 | 3/2009 | Fukano et al. .................. 345/90 |
| 2009/0128676 A1 | 5/2009 | Tanaka .......................... 348/300 |
| 2009/0140638 A1 | 6/2009 | Asano ........................... 313/504 |
| 2009/0218477 A1 | 9/2009 | Okita et al. | |

(Continued)

FOREIGN PATENT DOCUMENTS

| | | |
|---|---|---|
| CN | 101221975 A | 7/2008 |
| CN | 101266750 A | 9/2008 |

(Continued)

OTHER PUBLICATIONS

U.S. Appl. No. 13/205,836, filed Aug. 9, 2011, Takamasa Sakuragi.

(Continued)

*Primary Examiner* — Nhan T Tran
(74) *Attorney, Agent, or Firm* — Fitzpatrick, Cella, Harper & Scinto

(57) ABSTRACT

An imaging apparatus comprises: a plurality of memory capacitors for holding signals output from pixels; and a plurality of first switches for respectively connecting the memory capacitors to a common signal line, wherein each of the plurality of memory capacitors includes a terminal connected to the corresponding first switch and supplied with the corresponding signal output from the corresponding pixel, and another terminal supplied with a reference potential, a reference potential supplying unit supplies a first reference potential during a period in which the plurality of memory capacitors hold the signals, and supplies a second reference potential having a potential difference from a potential of the common signal line before turning-on of the first switch, the potential difference being larger than that of the first reference potential, during a period in which the first switches are turned on.

12 Claims, 9 Drawing Sheets

(56) References Cited

U.S. PATENT DOCUMENTS

2012/0086327 A1    4/2012    Asano ........................... 313/498
2012/0188428 A1    7/2012    Tanaka ......................... 348/300

FOREIGN PATENT DOCUMENTS

| | | |
|---|---|---|
| CN | 101437119 A | 5/2009 |
| EP | 2031576 A2 | 3/2009 |
| JP | 2-107075 A | 4/1990 |
| JP | 2008-241781 A | 10/2008 |

OTHER PUBLICATIONS

Notification of the First Office Action from the Chinese Patent Office dated Apr. 7, 2013, issued in counterpart Chinese Appl'n. No. 2011-10153366.9.

\* cited by examiner

US 8,638,384 B2

IMAGING APPARATUS FOR HIGH-SPEED SIGNAL READING

BACKGROUND OF THE INVENTION

1. Field of the Invention

The present invention relates to an imaging apparatus.

2. Description of the Related Art

As an example of a solid-state imaging apparatus, one disclosed in Japanese Patent Application Laid-Open No. H02-107075 is known. In the solid-state imaging apparatus disclosed in Japanese Patent Application Laid-Open No. H02-107075, signals from pixels arranged in two dimensions are temporarily stored in accumulation capacities arranged for respective columns, and subsequently, are successively read to a horizontal signal line via switches controlled to be turned on/off by means of pulses from a horizontal scanning circuit. A signal voltage appearing on the horizontal signal line is amplified by, e.g., an amplifier and output to the outside. With a recent increasing need for high speed shooting in digital cameras, an improvement in speed of read from accumulation capacities to a horizontal signal line leads to enhancement in competitiveness as camera products.

However, when signals are read from accumulation capacities to a horizontal signal line, capacitances and resistances of the horizontal signal line are distributed unevenly, and thus, the accumulation capacity in a column more distant from an output terminal of the horizontal signal line has a larger parasitic capacity and parasitic resistance, resulting in degradation in signal voltage waveform during signal reading. Consequently, there arises a difficulty in high-speed reading. A problem also arises in the resulting non-uniformity of the characteristics.

SUMMARY OF THE INVENTION

An object of the present invention is to provide an imaging apparatus capable of reading signals at a high speed.

In order to achieve the object, an imaging apparatus according to the present invention comprises: a plurality of pixels outputting signals derived by a photoelectric conversion; a plurality of memory capacitors for holding the signals outputted from the pixels; a common signal line for transmitting the signals held by the memory capacitors; and a plurality of first switches each for connecting each of the plurality of memory capacitors to the common signal line, wherein each of the plurality of memory capacitors has one terminal connected to the first switch and supplied with the signal outputted from the pixel, and the other terminal to which a reference potential is applied, the imaging apparatus further comprises a reference potential supplying unit for supplying the reference potential, and the reference potential supplying unit supplies a first reference potential during a period of holding the signals by the plurality of memory capacitors, and supplies a second reference potential during a period of turning on the first switch such that a potential difference between the second reference potential and a potential of the common signal line before turning on the first switch is greater than a potential difference between the first reference potential and the potential of the common signal line before turning on the first switch.

The imaging apparatus according to the present invention thereby enables high-speed signal reading.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

(First Embodiment)

Figure 8:
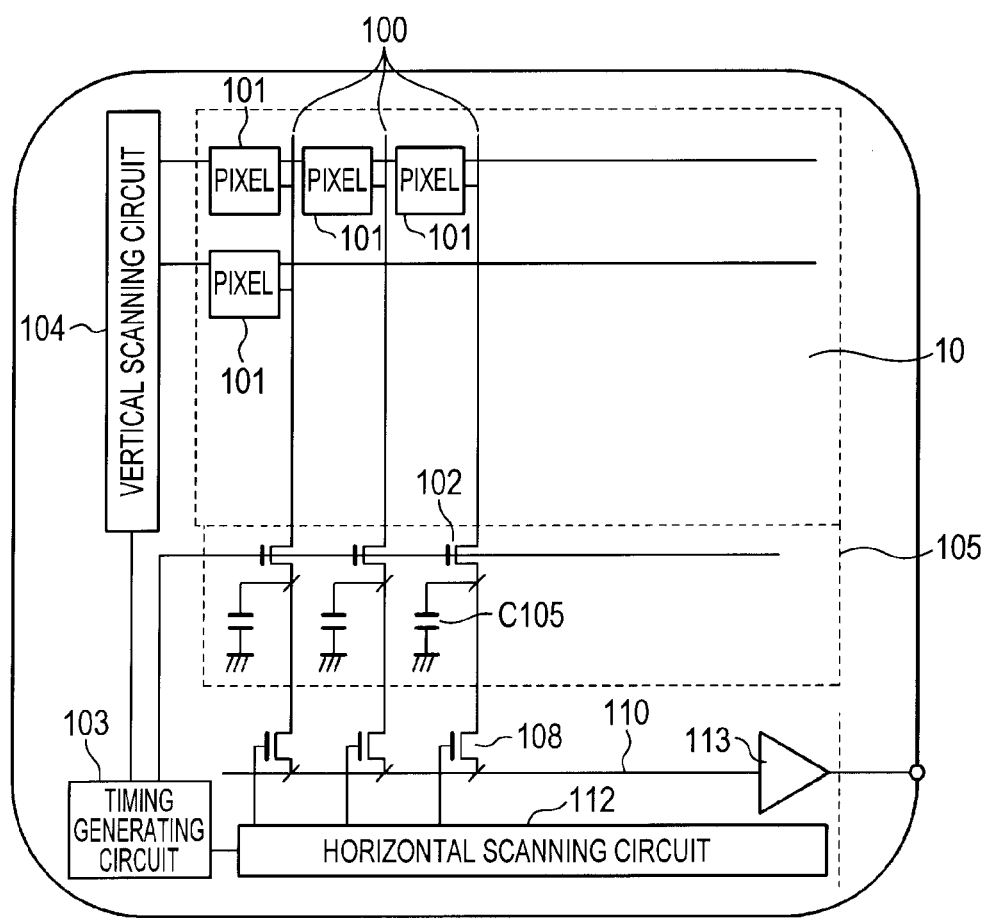
FIG. 8 is a diagram illustrating an imaging apparatus.

The principle of operation of an imaging apparatus according to a first embodiment of the present invention will be described with reference to FIGS. 8 to 10. FIG. 8 is a diagram schematically illustrating a configuration of an imaging apparatus. The imaging apparatus includes: a pixel unit 10, a timing generating circuit 103, a vertical scanning circuit 104, a column memory capacitor unit 105, first switches 108, vertical signal lines (first signal lines) 100, a common signal line 110, a horizontal scanning circuit 112 and an output amplifier 113. The pixel unit 10 includes a plurality of pixels 101 arranged in a two-dimensional matrix. The column memory capacitor unit 105 includes a switch 102 and a memory capacitor C105 for each column. The timing generating circuit 103 outputs timing signals to switches 102, the vertical scanning circuit 104 and the horizontal scanning circuit 112. Each pixel 101 includes a photoelectric conversion element that performs photoelectric conversion to convert light into an electrical signal and outputs the electrical signal resulting from the photoelectric conversion to the corresponding vertical signal line 100. The vertical signal lines 100, which are provided for the respective columns, are connected in common to the pixels 101 in the respective columns, and the pixels 101 output signals to the respective vertical signal lines 100. The vertical scanning circuit 104 selects pixels 101 on a row-by-row basis, and makes electrical signals from the selected pixels 101 be output to the corresponding vertical signal line 100. The switches 102 are respectively provided between the vertical signal lines 100 and the memory capacitors C105. Upon the switches 102 being turned on by means of control performed by the timing generating circuit 103, the memory capacitors C105 accumulate the signals on the vertical signal lines 100. The first switches 108 are respectively provided between the memory capacitors C105 and the common signal line 110. One terminal of each of the memory capacitors C105 is connected to corresponding switches 102 and 108, and the other terminal is connected to a corresponding switch 106. When the first switches 108 in the plurality of columns are successively turned on by means of control performed by the horizontal scanning circuit 112, the signals accumulated in the memory capacitors C105 in the columns are successively conveyed to the common signal line 110. The output amplifier 113, which is connected to the common signal line 110, amplifies and outputs the signals from the common signal line 110.

Figure 9:
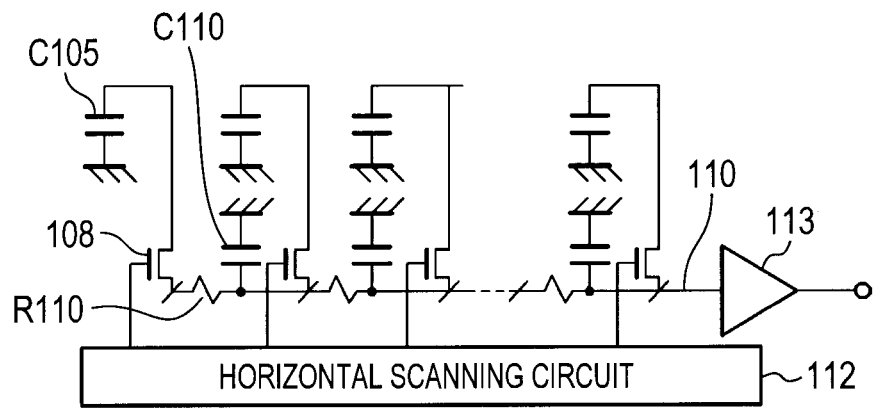
FIG. 9 is an equivalent circuit diagram of a partial circuit in an imaging apparatus.

FIG. 9 is a diagram in which a configuration of a part from the memory capacitors C105 to the output amplifier 113 of an imaging apparatus in FIG. 8 is extracted with the addition of parasitic capacities C110 and parasitic resistances R110. The parasitic capacities C110 are capacities of the common signal line 110, which are present for the respective columns. The parasitic resistances R110 are resistances of the common signal line 110, which are present for the respective columns.

Figure 10:
FIG. 10 is an equivalent circuit diagram of the partial circuit in FIG. 9.

FIG. 10 is an equivalent circuit diagram of a partial circuit in the configuration in FIG. 9. Between ground potential (reference potential) nodes, a memory capacitor C105, an on-resistance R108 for a first switch 108, a parasitic resistance R110 of the common signal line 110 and a parasitic capacity C110 of the common signal line 110 are connected in series. A voltage V105 is a voltage between terminals of the memory capacitor C105. A signal charge Q105 is a charge accumulated in the memory capacitor C105, and when the first switch 108 is turned on, moves to the parasitic capacity C110 of the common signal line 110, resulting in a voltage appearing on the common signal line 110. In order to promptly move the signal charge Q105 to the capacity C110, a current flowing as a result of the first switch 108 being turned on may be made to be as large as possible.

More specifically, during a period in which the memory capacitor C105 holds a signal, a first reference potential is supplied to the memory capacitor C105. Then, during a period in which the first switch 108 is on, a second reference potential having a potential difference from a potential of the common signal line 110 before the turning-on of the first switch 108 is larger than that of the first reference potential is supplied, thereby providing the larger current.

This operation will be described in details. The operation can be performed by, first, temporarily changing a reference voltage of the memory capacitor C105 from the ground potential to a positive voltage, and raising a voltage of the terminal connected to the memory capacitor C105 from among two terminals of the on-resistance R108 to increase a current flowing in the on-resistance R108. A voltage V105($t$) between the terminals of the memory capacitor C105 can be represented by expression (1) below, and a voltage V110($t$) between terminals of the parasitic capacity C110 can be represented by expression (2) below. Furthermore, a signal charge Q110($t$) in the common signal line 110 can be represented by expression (3) below, and a signal charge Q105($t$) in the memory capacitor C105 can be represented by expression (4) below. Furthermore, a current I($t$) flowing in the resistance R108 can be represented by expression (5) below.

$$V105(t)=Q105(t)/C105 \qquad (1)$$

$$V110(t)=Q110(t)/C110 \qquad (2)$$

$$Q110(t)=\int I(t)dt \qquad (3)$$

$$Q105(t)=Q105(0)-\int I(t)dt \qquad (4)$$

$$I(t)=(V105(t)-V110(t))/(R108+R110) \qquad (5)$$

Expression (3) indicates that assuming that an initial charge in the parasitic capacity C110 is 0, the charge Q110($t$) in the parasitic capacity C110 is equal to a time integration value of a current I flowing into the parasitic capacity C110. Expression (4) indicates that the charge Q105($t$) of the memory capacitor C105 is equal to a value resulting from subtracting the integration value of the current I(t) from the initial charge Q105(0). Expression (5) indicates that the current I(t) is equal to a value resulting from dividing a voltage applied to the resistances R108 and R110 by a sum of the resistances R108 and R110, and the voltage applied to the resistances R108 and R110 is a differential voltage between V105($t$) and V110($t$).

If the resistance R108 during the first switch 108 being on is fixed regardless of the voltage applied thereto, it is obvious from expression (5) that the current I(t) is larger as V105($t$) is larger. Considering a state immediately after the first switch 108 being turned on, the charge Q110 is 0, and thus, the voltage V110 is also 0. A time-dependent increase rate of the voltage V110 between the terminals of the parasitic capacity C110 can be obtained by expression (6) below, which indicates that the rate is proportional to the initial value V105(0) of the voltage V105 ($t$).

$$\frac{d\{V110(t)\}}{dt} = \frac{I(0)}{C110} = \frac{1}{\frac{C110 \times V105(0)}{(R108+R110)}} \qquad (6)$$

Here, since the voltage V105($t$) is the voltage between the terminals of the memory capacitor C105, if the reference voltage of the memory capacitor C105 is changed from the ground potential to a positive voltage VA, the voltage applied to the on-resistance R108 increases by that amount, resulting in the value of the current I(0) increasing as indicated by expression (7) below.

$$I(0)=(VA+V105(0))/(R108+R110) \qquad (7)$$

Hereinafter, a circuit configuration in which the reference voltage of the memory capacitor C105 is changed from the ground potential to the positive voltage VA will be described with reference to FIG. 1. As a countermeasure for the problem of a signal from a memory capacitor C105 more distant from the output amplifier 113 having larger waveform degradation during signal transfer, the value of the voltage VA from the voltage source is made to be smaller in a column closer to the output amplifier 113, rather than making the values of the voltages VA be equal throughout all the columns, thereby reducing the aforementioned speed increasing effect, enabling the provision of substantially uniform waveform degradation.

Figure 1:
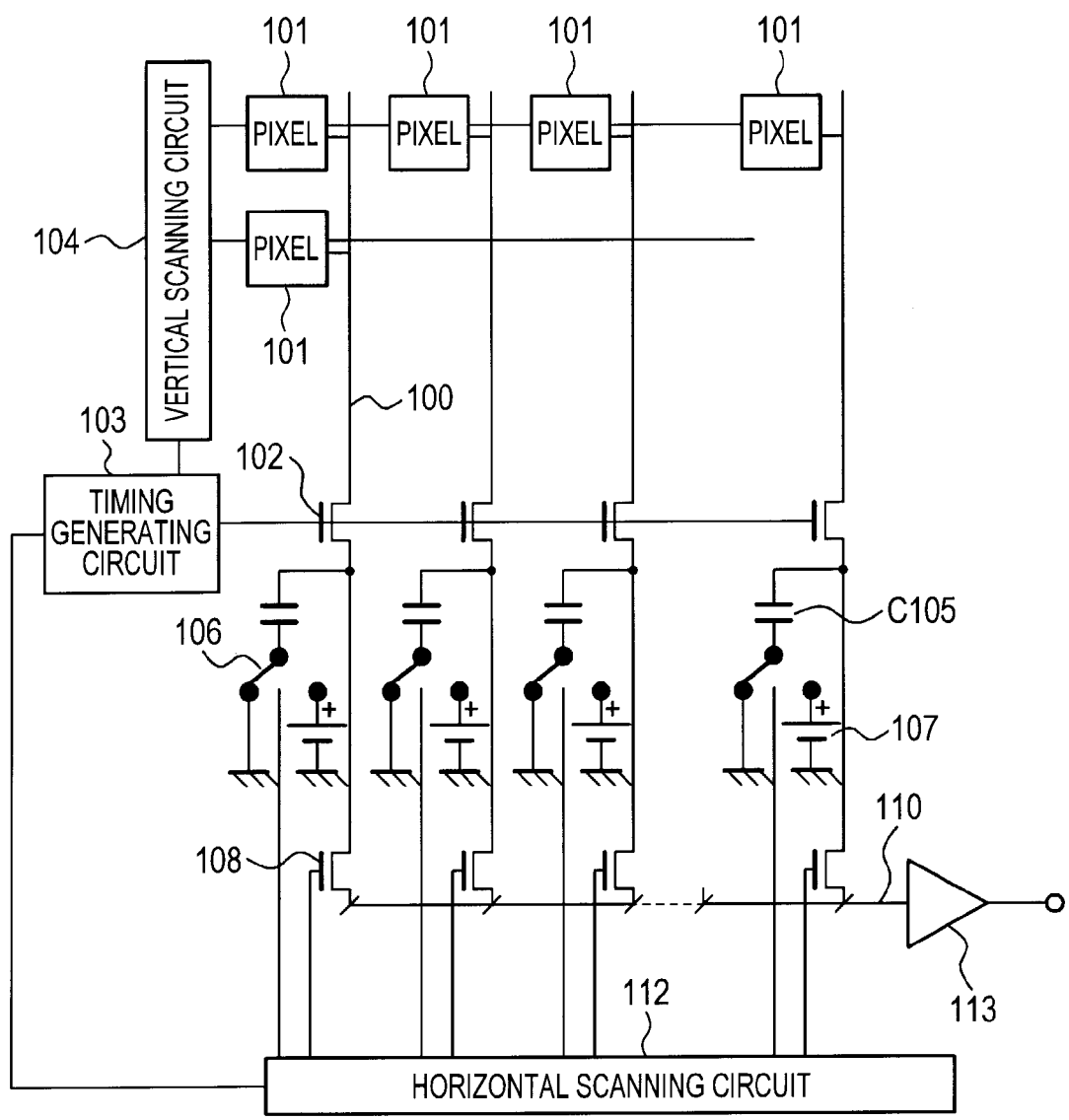
FIG. 1 is a diagram illustrating an example configuration of an imaging apparatus according to a first embodiment.

FIG. 1 is diagram illustrating an example configuration of an imaging apparatus according to the first embodiment of the present invention. The imaging apparatus in FIG. 1 is one obtained by adding reference potential changing switches 106 and voltage sources 107 to the imaging apparatus in FIG. 8. Points in which the imaging apparatus in FIG. 1 is different from the imaging apparatus in FIG. 8 will be described below. The reference potential changing switches 106 are provided for respective columns, and are connected to memory capacitors C105 in respective columns. The voltage sources 107, which are provided for the respective columns, output voltages VA. From among the voltage sources 107 in the respective columns, one in a column closer to the output amplifier 113 outputs a lower voltage, and one more distant from the output amplifier 113 outputs a higher voltage. Consequently, signal waveform degradation, which is uniform throughout the respective columns, is provided on the common signal line 110, enabling the provision of uniform characteristics. One end of each memory capacitor C105 is connected to a corresponding vertical signal line 100 via a corresponding switch 102, and the other end is connected to the corresponding reference potential changing switch 106. Under the control of a horizontal scanning circuit 112, the reference potential changing switches 106 connect the other ends of the memory capacitors C105 to ground potential nodes or the voltage sources 107 on a column-by-column basis. If the other end of a memory capacitor C105 is connected to the corresponding ground potential node, a ground potential (0V) is supplied to the other end of the memory capacitor C105. If the other end of the memory capacitor C105 is connected to the voltage source 107, a positive voltage VA is supplied to the other end of the memory capacitor C105.

Output signals from pixels 101 arranged in two dimensions are driven by pulses from the vertical scanning circuit 104, and output to respective vertical signal lines 100 as a result of the rows being successively selected. Switches 102, which are driven by pulses from the timing generating circuit 103, are turned on, the signals on the vertical signal lines 100 are accumulated in the memory capacitors C105. Each of the reference potential changing switches 106 is connected to the ground potential node side by means of a pulse from the horizontal scanning circuit 112 so that the reference voltage of the corresponding memory capacitor C105 at this time has the ground potential. Subsequently, the first switches 108 in the respective columns are successively turned on by means of scanning pulses from the horizontal scanning circuit 112, the signal charges accumulated in the memory capacitors C105 are transferred to the common signal line 110. Here, the reference potential changing switches 106 are controlled by means of pulses from the horizontal scanning circuit 112 so that each reference potential changing switch 106 is connected to the voltage source 107 side in accordance with a timing in which a scanning pulse is output from the horizontal scanning circuit 112.

Figure 2:
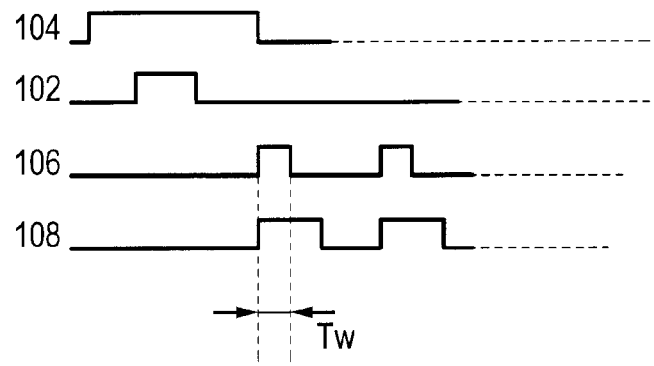
FIG. 2 is a timing chart for the imaging apparatus according to the first embodiment.

FIG. 2 is a timing chart illustrating control pulses in the imaging apparatus. During a period in which a pulse signal from the vertical scanning circuit 104 is at a high level, the pixels 101 in the relevant row are selected, and signals from the selected pixels 101 are output to the vertical signal lines 100. During a period in which a control pulse signal from a switch 102 is at a high level, the switch 102 is on, and the signal from the corresponding vertical signal line 100 is accumulated in the corresponding memory capacitor C105. A control pulse signal from the corresponding reference potential changing switch 106 at this time is at a low level, and the reference potential changing switch 106 is connected to the ground potential node side. Subsequently, control pulse signals from the first switches 108 in the respective columns successively transition to a high level, and the first switches 108 in the respective columns are successively turned on, the signal charges from the memory capacitors C105 are transferred to the common signal line 110. A period Tw in which the control pulse signal from each reference potential changing switch 106 is at a high level is included within a period in which the control pulse signal from the corresponding first switch 108 is at a high level, and during the period Tw, the reference potential changing switch 106 is connected to the voltage source 107 side. When the first switch 108 is off, the reference potential changing switch 106 supplies the ground potential to the other end of the corresponding memory capacitor C105, and in at least a part of period Tw of the period in which the first switch 108 is on, the reference potential changing switch 106 supplies the positive voltage VA to the other end of the memory capacitor C105. More specifically, when the first switch 108 is off, the reference potential changing switch 106 connects the other end of the memory capacitor C105 to the corresponding ground potential node. In at least a part of period Tw in the period in which the first switch 108 is on, the reference potential changing switch 106 connects the other end of the memory capacitor C105 to a corresponding positive voltage node.

As a result of the above-described operation, the signal charges accumulated in the memory capacitors C105 are transferred to the common signal line 110 at a high speed. A proper value for the period Tw may be time required for a majority of a charge accumulated in a memory capacitor C105 to be transferred to the common signal line 110. More specifically, the period Tw may be a value roughly three times a time constant determined by a capacity value of the memory capacitor C105, on-resistance values of the switches 106 and 108, and a parasitic capacity C110 of the common signal line 110. However, the value is not limited to a value three times the time constant.

Figure 11:
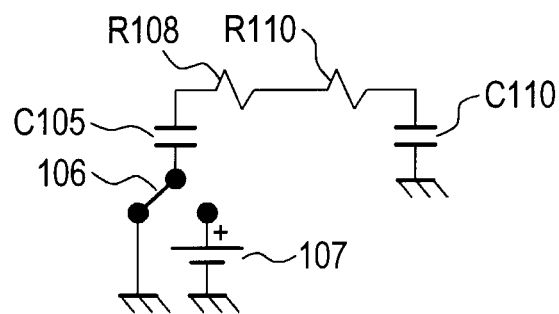
FIG. 11 is an equivalent circuit diagram of a partial circuit in the imaging apparatus according to the first embodiment.

FIG. 11 is an equivalent circuit diagram of a partial circuit in a column in the imaging apparatus in FIG. 1. A resistance R108 is an on-resistance of a first switch 108. A resistance R110 is a parasitic resistance of a common signal line 110. A capacity C110 is a parasitic capacity of the common signal line 110. The on-resistance R108, the parasitic resistance R110 and the parasitic capacity C110 are connected in series between an end of a memory capacitor C105 and a ground potential node. A reference potential changing switch 106 connects the other end of the memory capacitor C105 to a ground potential node or a voltage source 107. In other words, the reference potential changing switch 106 switches a reference potential (reference voltage) of the memory capacitor C105 to the ground potential or a positive voltage VA. If the reference potential changing switch 106 is connected to the voltage source 107 side, an initial voltage applied to the resistances R108 and R110 is VA+V105(0). Consequently, as described above, the current I(0) immediately after the switching of the reference potential changing switch 106 increases, and thus, based on expression (6), a time-dependent change rate of the voltage V110 also increases. This indicates that a signal charge is transferred from the memory capacitor C105 to the parasitic capacity C110 at a higher speed. In other words, the present embodiment enables a signal charge in the memory capacitor C105 to be transferred to the common signal line 110 at a high speed. Furthermore, from among the voltage sources 107 in the respective columns, one in a column more distant from the output amplifier 113 outputs a higher voltage, whereby signal waveform degradation, which is uniform throughout the respective columns, can be provided in the common signal line 110, enabling the provision of uniform characteristics.

Figure 12:
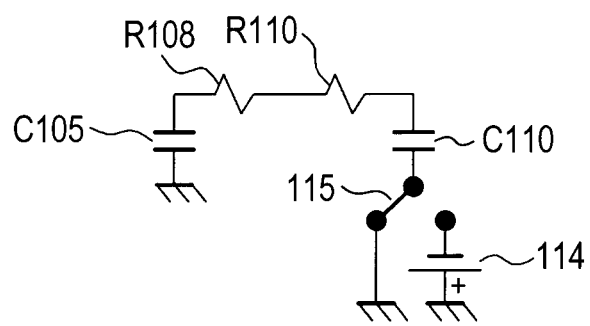
FIG. 12 is another equivalent circuit diagram of a partial circuit in the imaging apparatus according to the first embodiment.

FIG. 12 is a diagram illustrating another example configuration of the circuit in FIG. 11. Points in which the circuit in FIG. 12 is different from the circuit in FIG. 11 will be described. The other end of the memory capacitor C105 is fixedly connected to the ground potential node. One end of the parasitic capacity C110 is connected to one end of the memory capacitor C105 through the resistances R 108 and R110. A third switch 115 connects the other end of the parasitic capacity C110 to the ground potential node or a negative voltage source 114. When the third switch 115 is connected to the negative voltage source 114, a negative voltage VB is supplied to the other end of the parasitic capacity C110. A voltage of the ground potential node connected to the other end of the memory capacitor C105 becomes higher than the negative voltage VB of the negative power supply voltage 114 connected to the other end of the parasitic capacity C110, and thus, as in the case of FIG. 11, a signal charge in the memory capacitor C105 is transferred to the common signal line 110 at a high speed. More specifically, immediately after the first switch 108 is turned on, a reference potential of the capacity C110 is changed from the ground potential to the negative voltage VB for the period Tw by means of the third switch 115. A plurality of the third switches 115 are connected to the common signal line 110 through the capacities C110. Each third switch 115 supplies the ground potential to the common signal line 110 through the corresponding capacity C110 when the corresponding first switch 108 is off. In at least a part of period Tw in the period in which the first switch 108 is on, the third switch 115 supplies the negative voltage VB to the common signal line 110 through the capacity C110. Consequently, the initial current after the first switch 108 being turned on increases, enabling high-speed signal transfer. A more specific circuit configuration will be described later with reference to FIG. 6.

(Second Embodiment)

Figure 3:
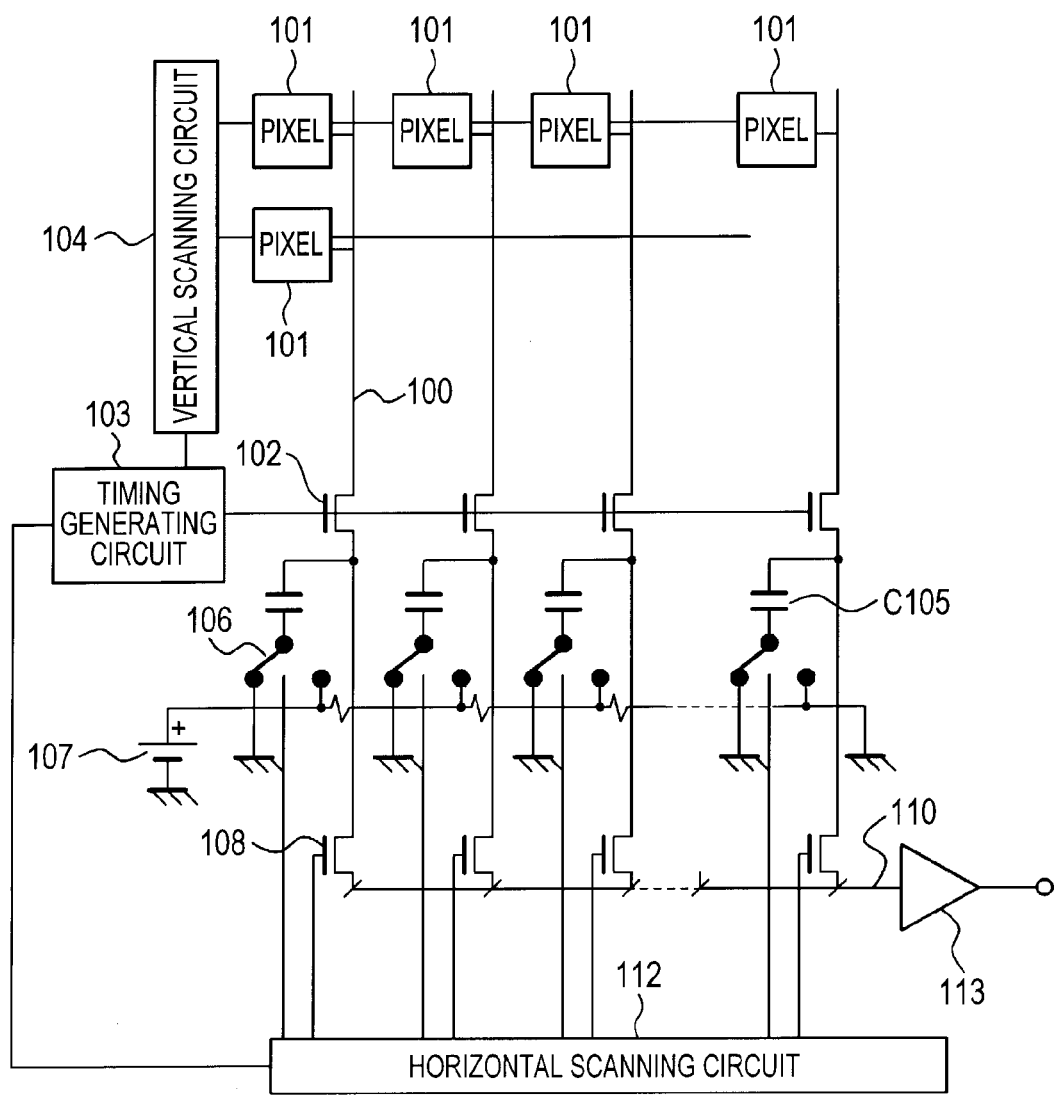
FIG. 3 is a diagram illustrating an example configuration of an imaging apparatus according to a second embodiment.

FIG. 3 is a diagram illustrating an example configuration of an imaging apparatus according to a second embodiment of the present invention. The present embodiment is different from the first embodiment in that instead of the voltage sources 107 arranged for the respective columns, a voltage-dividing circuit including one voltage source 107 and a resistance line is used. A resistance line is connected between the positive voltage source 107 and a ground potential node. On the resistance line, positive voltage nodes for the respective columns are provided at predetermined intervals. As a result of provision of the resistance voltage-dividing circuit, in the positive voltage nodes for the respective columns on the resistance line, one in a column closer to an output amplifier 113 has a lower voltage. A reference potential changing switch 106 in each column connects the other end of the memory capacitor C105 to a ground potential node or the positive voltage node in the corresponding column. Consequently, using the voltage source 107, uniform signal waveform degradation can be provided on the common signal line 110, enabling the provision of uniform characteristics. A plurality of the reference potential changing switches 106 can connect the other ends of a plurality of the memory capacitors C105 to a plurality of the positive voltage nodes, respectively. The plurality of the positive voltage nodes are supplied with a voltage resulting from resistive division by means of the resistance line connected between the voltage source 107 and the ground potential node. According to the present embodiment, the problem of signal waveform degradation when the signals are transferred from the memory capacitors C105 having dependency on the rows can be solved by changing (gradually decreasing) the reference potentials of the memory capacitors C105 for the respective columns by means of the voltage source 107 and the resistance voltage-dividing circuit.

(Third Embodiment)

Figure 4:
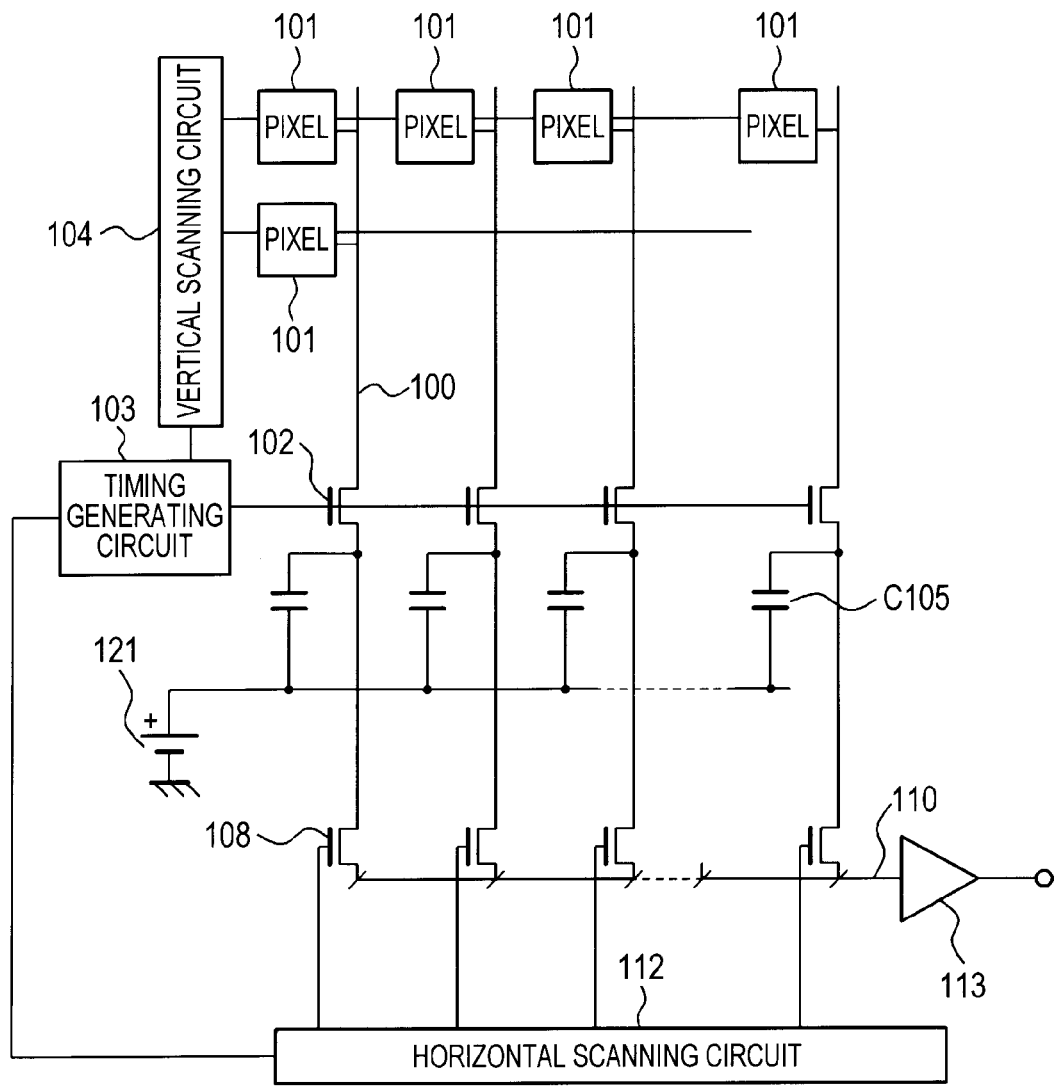
FIG. 4 is a diagram illustrating an example configuration of an imaging apparatus according to a third embodiment.
Figure 5:
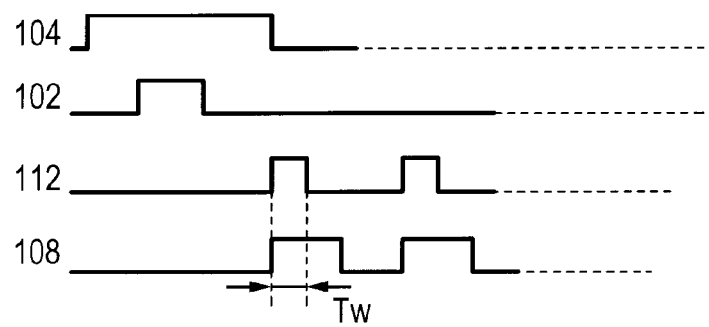
FIG. 5 is a timing chart for the imaging apparatus according to the third embodiment.

FIG. 4 is a diagram illustrating an example configuration of an imaging apparatus according to a third embodiment of the present invention, and FIG. 5 is a timing chart for the imaging apparatus according to the third embodiment. The imaging apparatus in FIG. 4 is different from the imaging apparatus in FIG. 3 in that instead of the voltage source 107 and the reference potential changing switches 106, a variable voltage source 121 is provided. The variable voltage source 121 is connected in common to the other ends of the memory capacitors C105 in the respective columns through a conductive line or a resistance line, enabling a ground potential or a positive voltage VA to be selectively supplied to the other ends of the memory capacitors C105. The timing chart in FIG. 5 is similar to the timing chart in FIG. 2. However, the variable voltage source 121 outputs a ground potential at a low level and outputs a positive voltage VA at a high level with a timing similar to that of the reference potential changing switch 106 in FIG. 2. In the timing chart in FIG. 5, the variable voltage source 121 changes the output from the ground potential to the positive voltage VA during a period Tw. The value of the positive voltage VA can be increased to a maximum voltage allowed by a semiconductor process for providing an imaging apparatus, and a larger speed increasing effect can be provided as the value is larger. Furthermore, the polarity of the variable voltage source 121 depends on the polarity of the charge transferred from the memory capacitors C105, and a high-speed transferring effect can be provided by a positive voltage in the case of positive polarity, and can also be provided by a negative voltage in the case of negative polarity.

(Fourth Embodiment)

Figure 6:
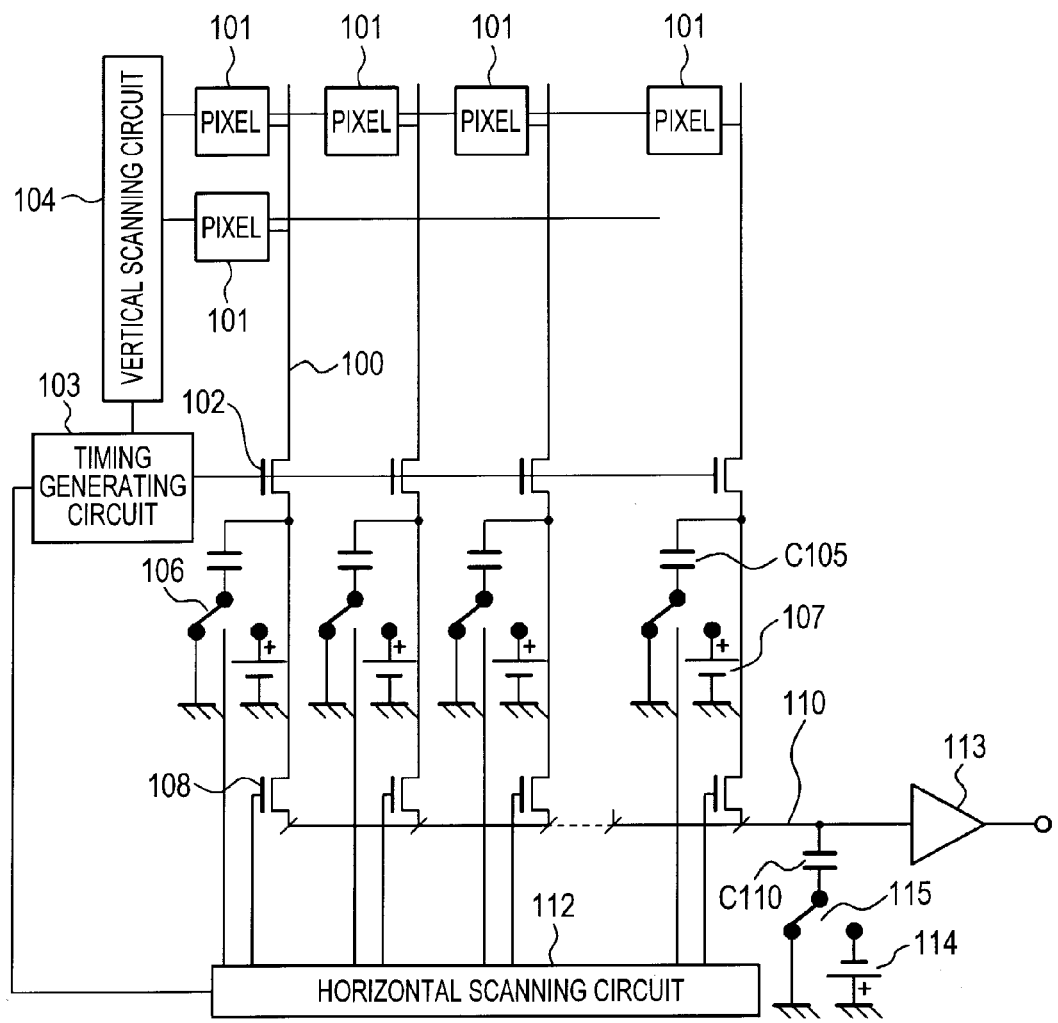
FIG. 6 is a diagram illustrating an example configuration of an imaging apparatus according to a fourth embodiment.
Figure 7:
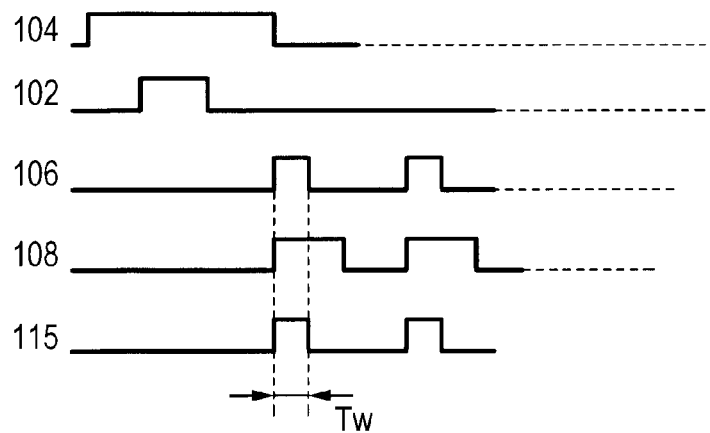
FIG. 7 is a timing chart for the imaging apparatus according to the fourth embodiment.
Figure 13:
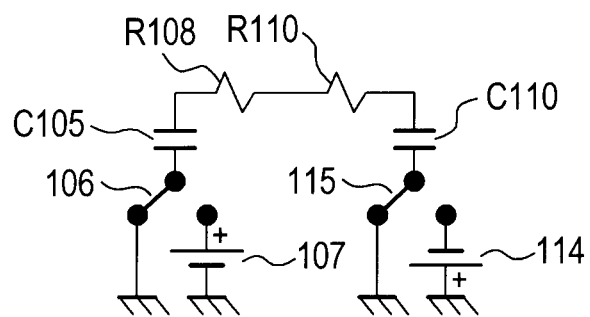
FIG. 13 is an equivalent circuit diagram of a partial circuit in the imaging apparatus according to the fourth embodiment.

FIG. 6 is a diagram illustrating an example configuration of an imaging apparatus according to a fourth embodiment of the present invention, and FIG. 7 is a timing chart for the imaging apparatus according to the fourth embodiment. The imaging apparatus in FIG. 6 is an example in which reference potentials of two capacities C105 and C110 are changed simultaneously using switches 106 and 115 as illustrated in FIG. 13, which is a combination of FIGS. 11 and 12. The circuit in FIG. 13 is one obtained by adding a third switch 115 and a negative voltage source 114 to the circuit in FIG. 11. The third switch 115 connects the other end of the parasitic capacity C110 to a ground potential or the negative voltage source 114. The imaging apparatus in FIG. 6 is one obtained by adding third switches 115 and negative voltage sources 114 to the imaging apparatus in FIG. 1. One end of each parasitic capacity C110 is connected to a common signal line 110, and the other terminal is connected to the corresponding third switch 115. The third switch 115 connects the other terminal of the corresponding parasitic capacity C110 to the ground potential or the negative voltage source 114. Points in which the timing chart in FIG. 7 is different from the timing chart in FIG. 2 will be described. When a control pulse signal from a first switch 108 transitions to a high level, the first switch 108 is turned on, and a signal charge accumulated in a corresponding memory capacitor C105 is transferred to a common signal line 110. During a period Tw in a period in which the control pulse signal from the first switch 108 is at a high level, control pulse signals from switches 106 and 115 transition to a high level simultaneously. During a period other than the period Tw, the control pulse signals from the switches 106 and 115 are at a low level. The reference potential changing switch 106 is connected to a ground potential node when the control pulse signal is at a low level, and connected to a positive voltage source 107 when the control pulse signal is at a high level. The third switch 115 is connected to a ground potential node when the control pulse signal is at a low level, and connected to the negative voltage source 114 when the control pulse signal is at a high level. In the period Tw, the reference potential of the memory capacitor C105 is switched from the ground potential to a positive voltage VA, and the reference potential of the parasitic capacity C110 of the common signal line 110 is switched from the ground potential to a negative voltage VB. Consequently, the reference potential of the memory capacitor C105 is made to be higher than the reference potential of the parasitic capacity C110 of the common signal line 110, enabling a signal charge in the memory capacitor C105 to be transferred to the common signal line 110 at a high speed.

(Fifth Embodiment)

Figure 14:
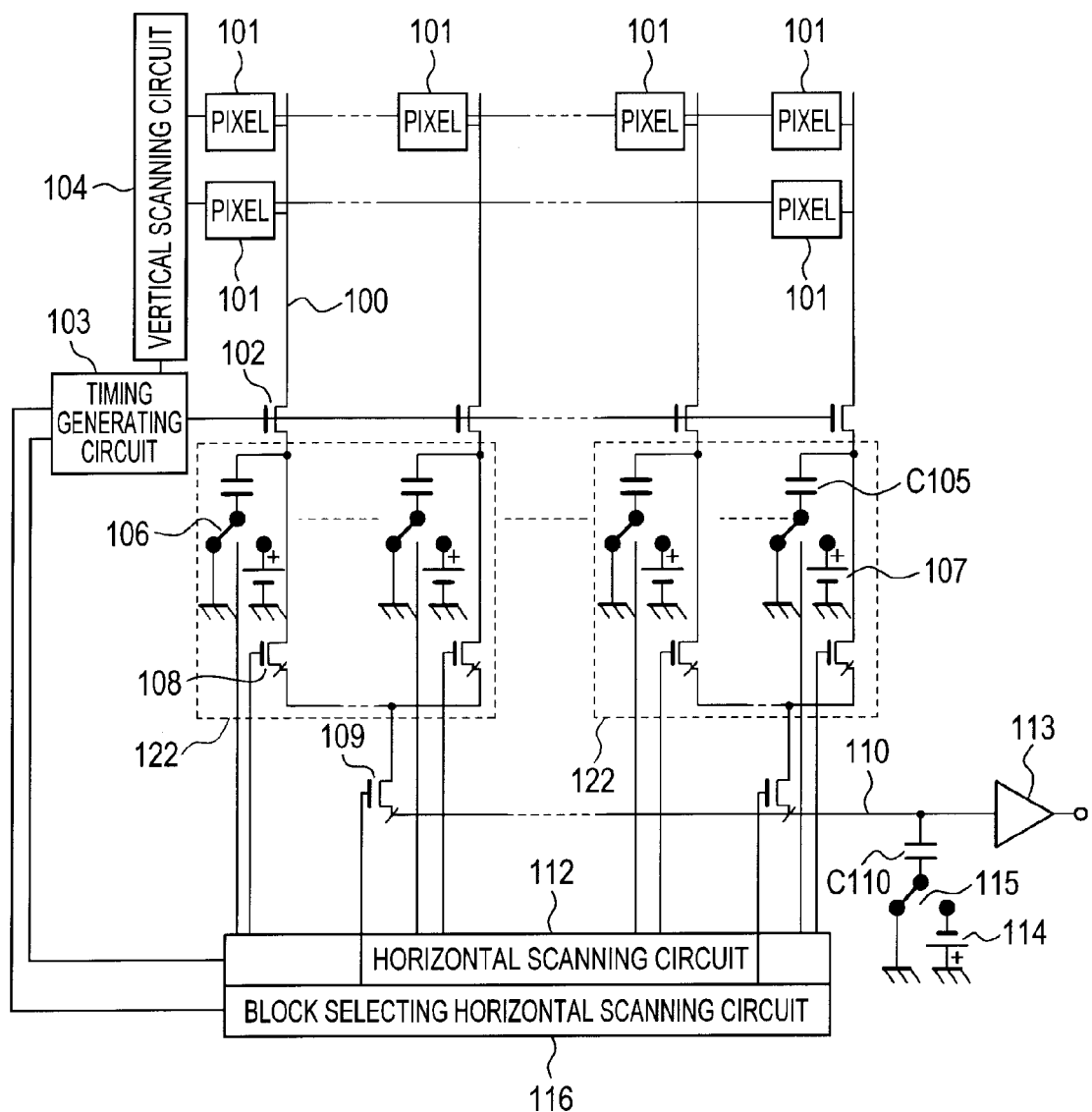
FIG. 14 is a diagram illustrating an example configuration of an imaging apparatus according to a fifth embodiment.
Figure 15:
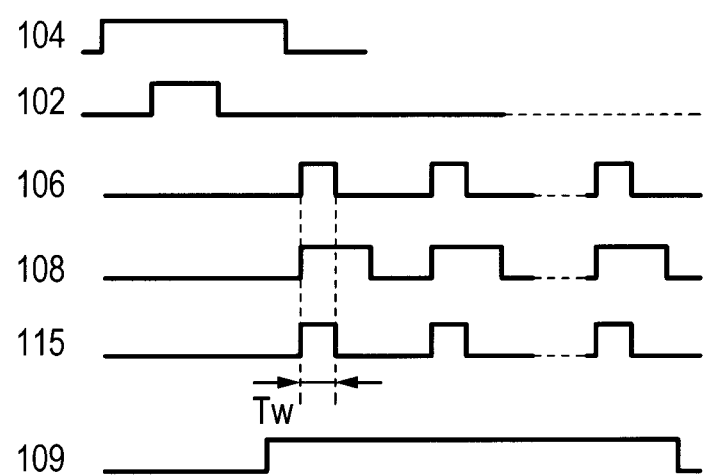
FIG. 15 is a timing chart for the imaging apparatus according to the fifth embodiment.

FIG. 14 is a diagram illustrating an example configuration of an imaging apparatus according to a fifth embodiment of the present invention, and FIG. 15 is a timing chart for the imaging apparatus according to the fifth embodiment. The imaging apparatus in FIG. 14 is one obtained by adding fourth switches 109 and a block selecting horizontal scanning circuit 116 to the fourth embodiment, and can select read circuit blocks 122. Points in which the present embodiment is different from the fourth embodiment will be described below. Memory capacitors C105, reference potential changing switches 106, voltage sources 107 and first switches 108 are divided into a plurality of read circuit blocks 122 with a plurality of columns as a unit. The first switches 108 in each read circuit block 122 are connected in common to one switch 109. A fourth switch 109 is provided for each read circuit block 122, and one end of the fourth switch 109 is connected to all the switches 108 in the corresponding read circuit block 122, and the other terminal is connected to the common signal line 110. The block selecting horizontal scanning circuit 116 performs control to turn the fourth switches 109 on/off. The first switches 108 are divided into the read circuit blocks 122. Each fourth switch 109 is provided between the first switches 108 in the corresponding read circuit block 122 and the common signal line 110, and the fourth switches 109 are successively turned on to successively select the read circuit blocks 122. Points in which the timing chart in FIG. 15 is different from the timing chart in FIG. 7 will be described below. A fourth switch 109 is off when a control pulse signal from the fourth switch 109 is at a low level, and is on when the control pulse signal is at a high level. The fourth switches 109 are successively turned on, whereby signals from the respective read circuit blocks 122 are successively output to the common signal line 110. During a period in which a control pulse signal from one switch 109 is at a high level and thereby one read circuit block 122 is selected, as in FIG. 7, all the switches 108 in the read circuit block 122 are successively turned on. During a period Tw in a period in which the first switch 108 is on, the corresponding switch 106 and a switch 115 are turned on simultaneously, enabling a signal charge in the corresponding memory capacitor C105 to be transferred to the common signal line 110 at a high speed.

In the first, second and fifth embodiments, a switch 106 and a voltage source 107 provide a reference potential supplying unit that changes a reference potential of a memory capacitor C105 and a reference potential of a common signal line 100 so that the difference between the reference potentials become larger during a period in which a first switch 108 is on. In FIG. 12, the aforementioned reference potential supplying unit is provided by a third switch 115 and a voltage source 114. In the third embodiment, the reference potential supplying unit is provided by a variable voltage source 121. In the fourth embodiment, the reference potential supplying unit is provided by a reference potential changing switch 106, a voltage source 107, a third switch 115 and a voltage source 114.

The aforementioned reference potential supplying unit controls the above-described reference potentials so that the reference potentials enter a state described below when changing the reference potentials: the control is performed so that on the common signal line 110, the difference in reference potential between a memory capacitor C105 connected to a position distant from an output amplifier 113 and the common signal line 110 is larger than the difference in reference potential between a memory capacitor C105 connected to a position close to the output amplifier 113 and the common signal line 110.

Any of the above-described embodiments is a mere specific example for carrying out the present invention, and the technical scope of the present invention should not be limitedly construed by the above-described embodiments. In other words, the present invention can be carried out in various modes without departing from the technical idea or main features thereof. Various combinations of the above-described embodiments are possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-135391, filed Jun. 14, 2010, which is hereby incorporated by reference herein in its entirety.

What is claimed is:

1. An imaging apparatus including a plurality of pixels configured to output signals derived by photoelectric conversion, the imaging apparatus comprising a plurality of memory capacitors configured to hold the signals outputted from the plurality of pixels;

a common signal line configured to transmit the signals held by the plurality of memory capacitors;

a reference potential supplying unit configured to supply a reference potential; and a plurality of first switches configured to respectively connect each of the plurality of memory capacitors to the common signal line, wherein each of the plurality of memory capacitors has a first terminal connected to the first switch and supplied with a signal outputted from a pixel, and a second terminal to which the reference potential is applied, and the reference potential supplying unit supplies a first reference potential during a period of holding the signals by the plurality of memory capacitors, supplies a second reference potential during a part of a period of turning on a first switch, and supplies the first reference potential before the first switch is turned off, such that a potential difference between the second reference potential and a potential of the common signal line before turning on the first switch is greater than a potential difference between the first reference potential and the potential of the common signal line before turning on the first switch.

2. The imaging apparatus according to claim 1, further comprising an output amplifier, wherein the reference potential supplying unit controls the reference potential such that a potential difference between the second reference potential supplied to a memory capacitor arranged distant from the output amplifier on the common signal line and the potential of the common signal line before turning on the first switch is larger than a potential difference between the second reference potential supplied to a memory capacitor arranged closer to the output amplifier on the common signal line and the potential of the common signal line before turning on the first switch.

3. The imaging apparatus according to claim 1, further comprising a first signal line configured to transmit a signal derived by photoelectric conversion outputted from a pixel, wherein the reference potential supplying unit includes a plurality of reference potential changing switches respectively connected to each of the second terminals of the plurality of memory capacitors, and each reference potential changing switch supplies a ground potential to the second terminal of a corresponding memory capacitor when a corresponding first switch is turned off, and the reference potential changing switch supplies a positive potential to the second terminal of the corresponding memory capacitor during at least a part of a period in which the corresponding first switch is on.

4. The imaging apparatus according to claim 3, wherein the plurality of reference potential changing switches are respectively capable of connecting each of the second terminals of the plurality of memory capacitors to each of a plurality of positive voltage nodes, and the plurality of positive voltage nodes are supplied with resistively divided voltages through resistor lines connected between a voltage source and ground potential nodes.

5. The imaging apparatus according to claim 1, wherein the reference potential supplying unit includes a plurality of voltage supplying switches connected to the common signal line through capacitors, and each voltage supplying switch supplies a ground potential to the common signal line through a corresponding capacitor when a corresponding first switch is turned off, and the voltage supplying switch supplies a negative potential to the common signal line through the corresponding capacitor during at least a part of a period during which the corresponding first switch is on.

6. The imaging apparatus according to claim 1, wherein the plurality of first switches are divided into a plurality of blocks, and the imaging apparatus includes a plurality of block selecting switches respectively arranged between a first switch in each of the plurality of blocks and the common signal line, and the plurality of block selecting switches are successively turned on for selecting successively the plurality of blocks.

7. A method of driving an imaging apparatus having a plurality of pixels configured to output signals derived by a photoelectric conversion comprising:

a plurality of memory capacitors configured to hold the signals outputted from the plurality of pixels;

a common signal line configured to transmit the signals held by the plurality of memory capacitors; and a plurality of first switches configured to respectively connect each of the plurality of memory capacitors to the common signal line, wherein each of the plurality of memory capacitors has a first terminal connected to the first switch and supplied with the signal outputted from the pixel is applied, and a second terminal to which a reference potential is applied, wherein the method of driving comprising:

supplying a first reference potential during a period of holding the signals by the plurality of memory capacitors; and supplying a second reference potential during a part of a period of turning on a first switch and supplies the first reference potential before the first switch is turned off, and wherein the first and second reference potentials are supplied, such that a potential difference between the second reference potential and a potential of the common signal line before turning on the first switch is greater than a potential difference between the first reference potential and the potential of the common signal line before turning on the first switch.

8. The method according to claim 7, wherein the imaging apparatus further comprises an output amplifier, and wherein the method further comprising:

controlling the reference potential, such that a potential difference between the second reference potential supplied to the memory capacitor arranged distant from the output amplifier on the common signal line and the potential of the common signal line before turning on the first switch is larger than a potential difference between the second reference potential supplied to the memory capacitor arranged closer to the output amplifier on the common signal line and the potential of the common signal line before turning on the first switch.

9. The method according to claim 7, wherein the imaging apparatus further comprises a first signal line configured to transmit a signal derived by photoelectric conversion outputted from the pixel, and the method further comprises:

supplying a ground potential to the second terminal of the memory capacitor when the first switch is turned off, and supplying a positive potential to the second terminal of the memory capacitor during a period of at least a part of a period of turning on the first switch.

10. The method according to claim 7, wherein the apparatus further including a reference potential supplying unit, the reference potential supplying unit having a plurality of reference potential changing switches each connected to each of the second terminals of the plurality of memory capacitors, wherein the method further comprising:

the plurality of reference potential changing switches are respectively capable of connecting each of the second terminals of the memory capacitors to each of a plurality of positive voltage nodes, and the plurality of positive voltage nodes are supplied with resistively divided voltages through resistor lines connected between a voltage source and ground potential nodes.

11. The method according to claim 10, wherein the reference potential supplying unit includes a plurality of voltage supplying switches connected to the common signal line through capacitors, and the method further comprising:

supplying by the voltage supplying switch a ground potential to the common signal line through the capacitor when the first switch is turned off, and supplying by the voltage supplying switch a negative potential to the common signal line through the capacitor during a period of at least a part of a period of turning on the first switch.

12. The method according to claim 10, wherein the plurality of first switches are divided in to a plurality of blocks, and the imaging apparatus includes a plurality of block selecting switches each arranged between the first switch in each of the blocks and the common signal line, and the method further comprises:

successively turning on the plurality of block selecting switches for selecting successively the plurality of blocks.

* * * * *